Jan. 17, 1939.                R. F. MORRISON                2,144,076
                             DUPLICATING MACHINE
                 Filed July 8, 1937            7 Sheets-Sheet 1

Inventor:
Robert F. Morrison,
By: Zabel, Carlson, Gritzbaugh & Wells,
Attorneys.

Jan. 17, 1939.   R. F. MORRISON   2,144,076
DUPLICATING MACHINE
Filed July 8, 1937   7 Sheets-Sheet 3

Inventor:
Robert F. Morrison
By Zabel, Carlson, Fitzhaugh & Wells
Attorneys

Patented Jan. 17, 1939

2,144,076

UNITED STATES PATENT OFFICE 2,144,076

DUPLICATING MACHINE

Robert F. Morrison, Oak Park, Ill., assignor to Ditto, Incorporated, Chicago, Ill., a corporation of West Virginia Application July 8, 1937, Serial No. 152,517

21 Claims. (Cl. 101—132)

The invention relates to duplicating machines and a particular object of the invention is to provide improved means whereby the machine may be adjusted to determine the margin which will be left at one end of each copy sheet.

A preferred form of the invention is embodied in a duplicating machine of the type wherein master sheets of paper are employed, the copy sheets being moistened with a suitable solvent for the ink or carbon on the master sheet and then brought into contact with the master sheet so that the data on the master sheet will be duplicated on the copy sheets.

The master sheets have the data to be duplicated written or typewritten thereon in reverse so that when a portion of the carbon or ink is dissolved and transferred to the moistened surface of a copy sheet, it will appear in correct readable form.

The machine comprises means which may be adjusted manually to obtain one of a plurality of margins at the top end of each copy sheet.

Other objects and advantages will become apparent as the following detailed description progresses, reference being had to the accompanying drawings, wherein—

Referring to the drawings wherein a preferred form of the invention is embodied in a duplicating machine which is of the same type as the duplicating machine described in application Serial No. 44,911 filed October 14, 1935, by John W. Hernlund, the reference character 22 designates generally the frame of the present machine, in which frame an electric motor 27 is mounted, having a pulley 34 fixed to its drive shaft. A second pulley 36 is driven through an endless belt 35 by the pulley 34. A pulley 43 constrained to rotate with the pulley 36 is connected operatively by a belt 44 to a pulley 45 with which a pinion 50 is constrained to rotate. The pinion 50 meshes with a gear 52 rotatably journalled upon a shaft 53 which carries a duplicating drum 54. Obviously, the gear 52 will rotate whenever the motor 27 is in operation.

The shaft 53 is rotatably journalled in the frame 22, and the drum 54 is constrained to rotate with the shaft. The gear 52 is rotatably mounted upon a bushing (not shown) disposed around the shaft 53.

Figure 1:
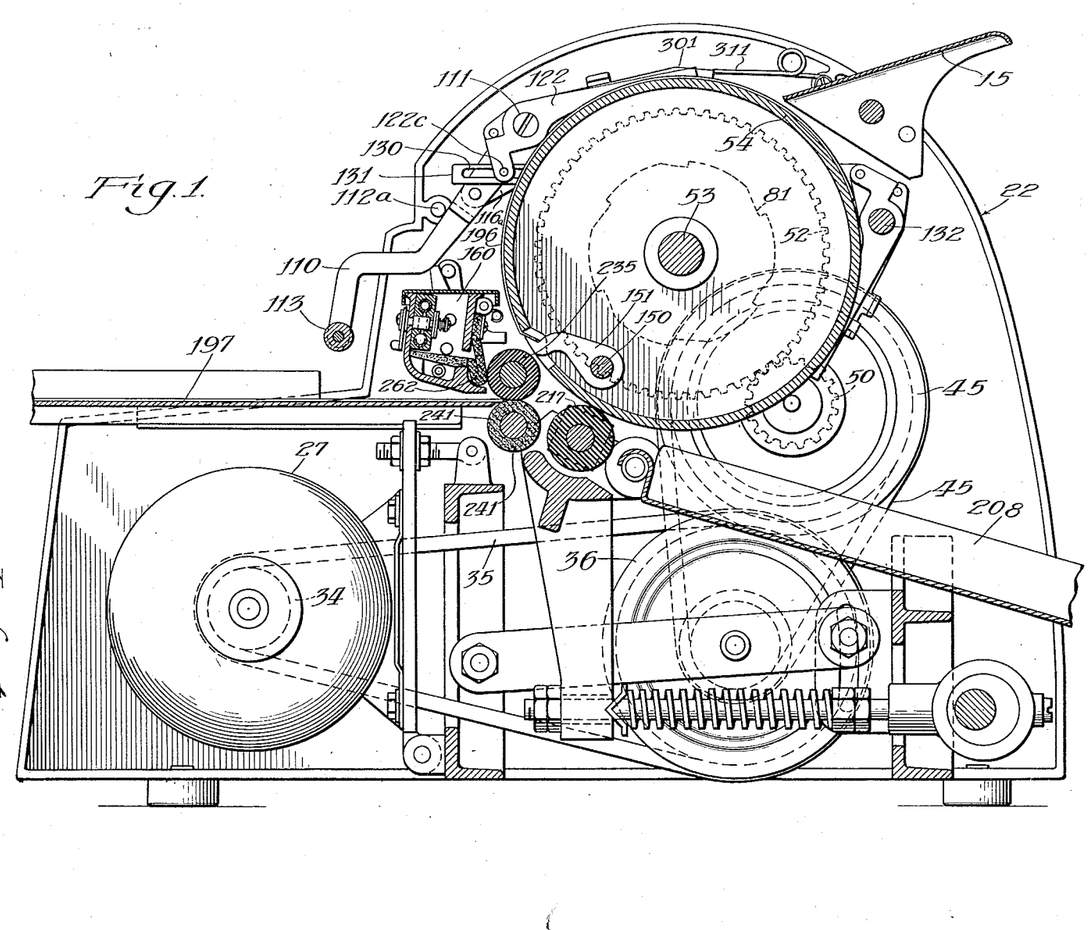
Fig. 1 is a vertical longitudinal section taken through a duplicating machine which embodies the invention.
Figure 2:
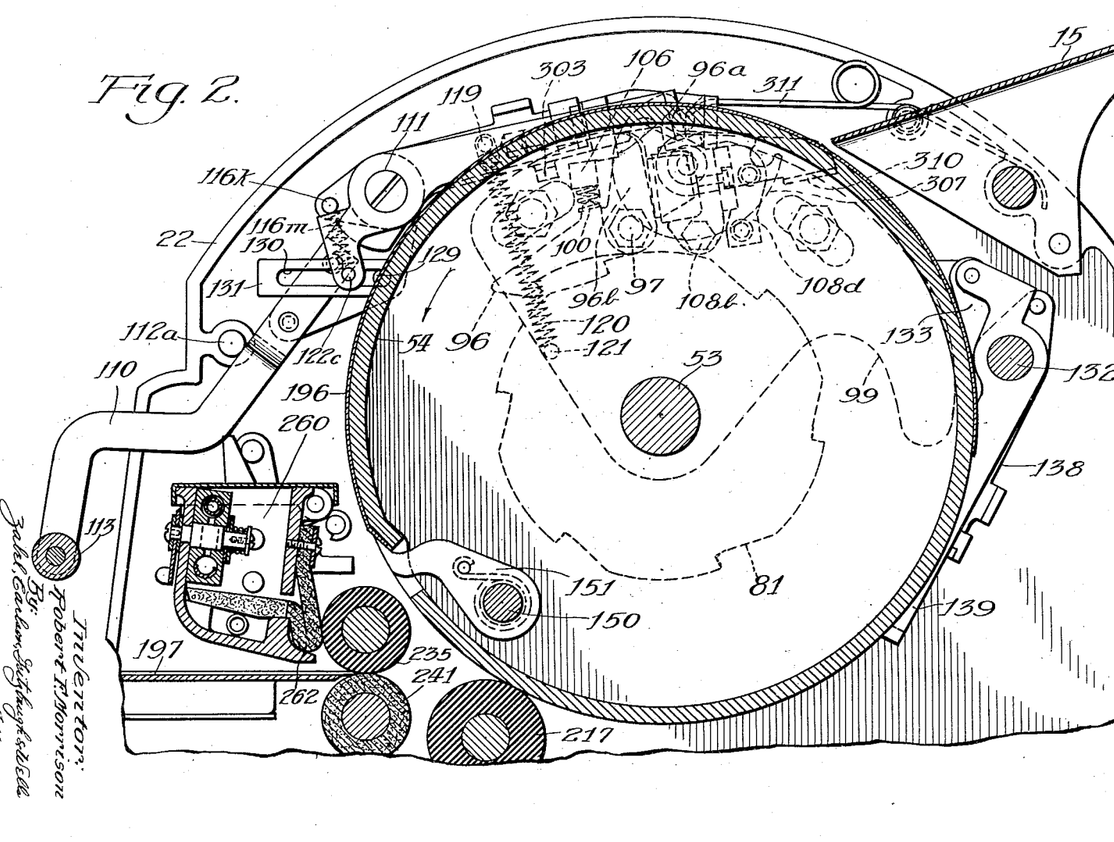
Fig. 2 is an enlarged fragmentary longitudinal section taken on substantially the same line as Fig. 1.

Rotatably journalled in the end walls of the drum 54 and extending through the drum is a shaft 150 which carries a plurality of gripper units 151 adapted to grip the forward edge of a master sheet 196 (Fig. 1). The master sheet 196 carries the data to be duplicated, the data being typewritten or written in reverse upon the exposed side of the master sheet and being formed from ink or carbon which may be subjected to a solvent, so that when copy sheets are pressed into contact with the master sheet during the rotation of the drum 54, the data on the master sheet will be duplicated upon the copy sheets but not in reverse.

The means for pressing the copy sheets against the master sheet 196 is a platen or impression roller 217. The copy sheets are fed to the duplicating drum 54 and the platen roller 217 by combined feeding and moistening rollers 235 and 241.

A feed table 197 is provided upon which a stack of copy sheets may be placed and advanced manually one by one to the rollers 235 and 241. The roller 235 is supplied with solvent by means comprising a felt strip 262 which projects from a container 260 holding a supply of the solvent. The solvent applied to the roller 235 is transferred to the upper surfaces of the copy sheets as they pass between the rollers 235 and 241. The roller 235 is driven by means (not shown) so that it rotates in synchronism with the drum 54. The roller 241 is driven by the roller 235.

As the copy sheets are pressed against the master sheet by the platen roller 217, they are discharged into a tray 208 detachably secured to the frame 22.

The machine is provided with a master sheet guide table 15 carried by the frame. When a master sheet is to be secured to the drum 54, the drum is brought to a stop as hereinafter explained, with the gripper units 151 aligned with the guide table 15 and with the gripper units in their open positions so that the operator may slide the master sheet down over the guide table 15 until its forward edge may be gripped by the gripper units.

Figure 14:
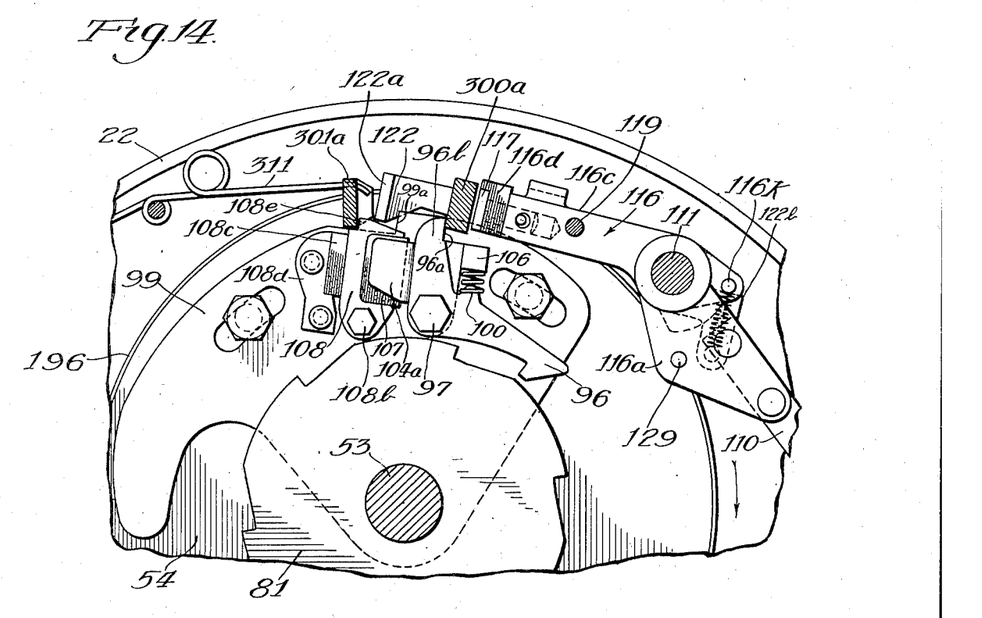
Fig. 14 is a fragmentary section taken on line 14—14 of Fig. 3.
Figure 15:
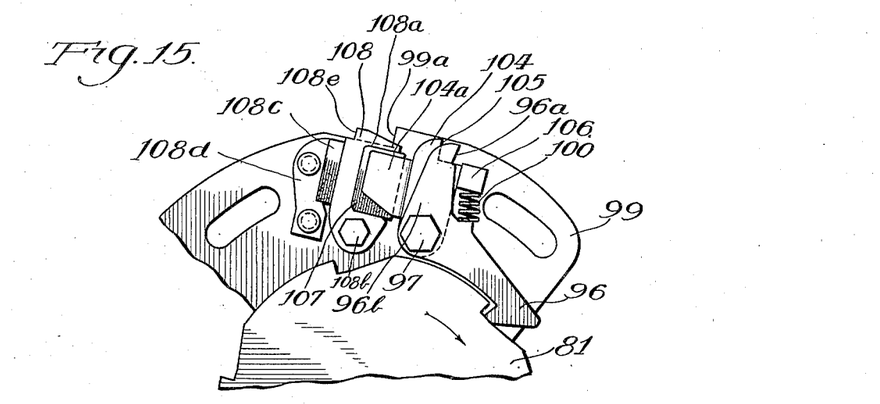
Fig. 15 is a section taken on the same line as Fig. 14 but omitting some mechanism to illustrate better certain other mechanism, part of the mechanism shown in Fig. 15 being shown in a changed position.

During each cycle of operation of the improved machine, the drum 54 is connected positively to the continuously rotating gear wheel 52 by a mechanism which comprises a ratchet wheel 81 constrained to rotate with the gear wheel 52 (Figs. 14 and 15). The ratchet wheel 81 is engageable by a pawl 96 pivoted on a pin 97 which projects from a cam plate 99. The plate 99 is constrained to rotate with the drum 54. A compression spring 100 yieldingly urges the pawl 96 toward the ratchet 81. Pivoted on the pin 97 and disposed between the pawl 96 and the plate 99 is a block 104 which has a shoulder 105 that may be aligned with a shoulder 96a provided upon a tail piece 96b of the pawl 96. On one side, the block 104 is engageable with a stop pin 106 on the plate 99. On its other side, the block 104 has a bracket 104a secured to it, which bracket 104a abuts against and holds in place a rubber cushion 107 which is seated in a recess 108a formed in a block 108 pivoted upon a pin 108b projecting from the plate 99. A rubber cushion 108c is secured to one side of the block 108 and abuts against a block 108d rigidly secured to the plate 99.

The pawl 96 and the block 104 are not connected to each other but both of them are pivoted on the pin 97.

There are two control mechanisms for effecting release of the drum 54 from driving connection with the ratchet wheel 81 on the drive gear 52. One of these mechanisms is operable to stop the drum in position for feeding a new copy sheet thereto, while the other mechanism is operable to stop the drum for applying a new master sheet thereon.

Figure 10:
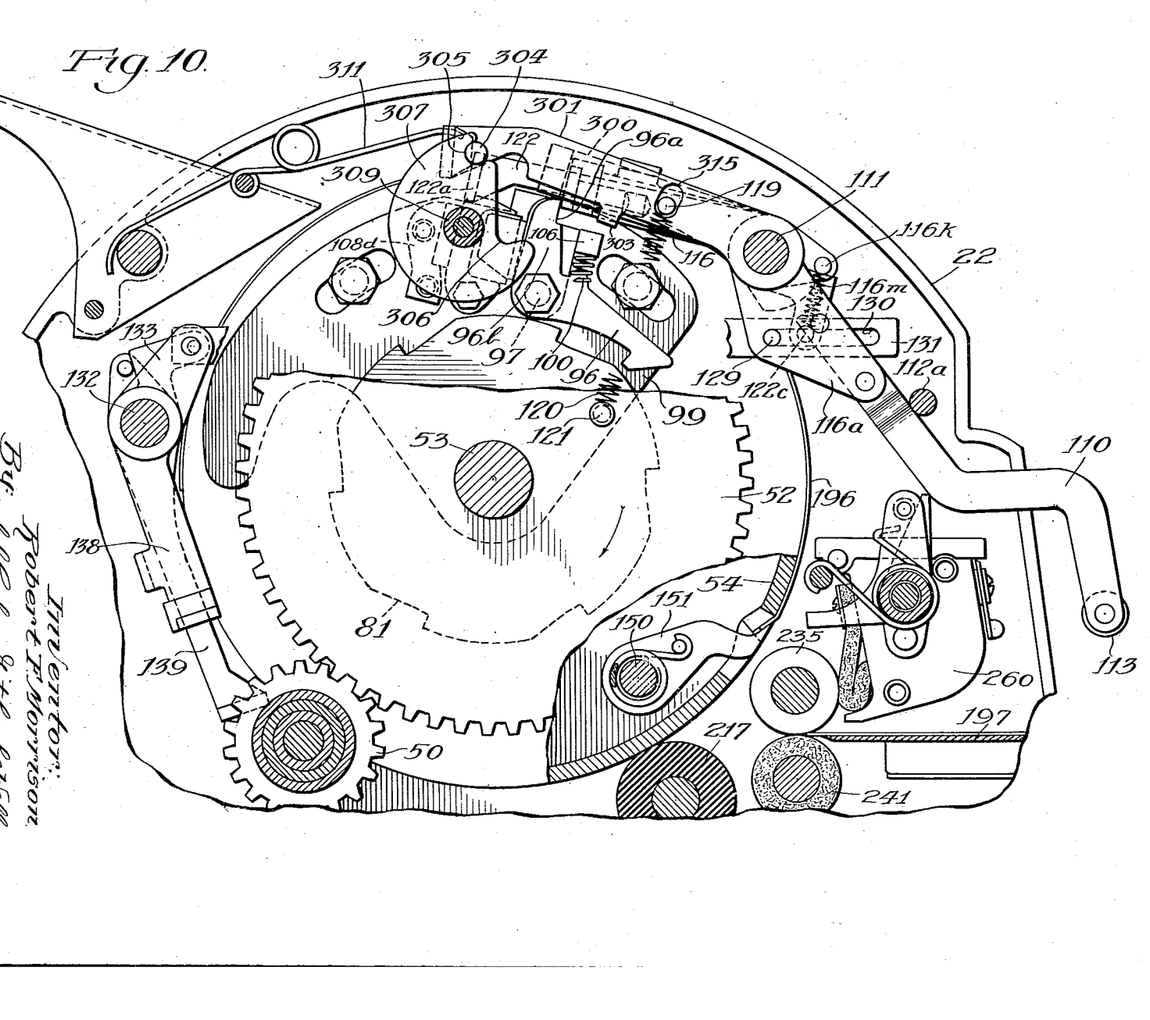
Fig. 10 is a fragmentary section taken on substantially the same line as Fig. 9 but showing certain parts in changed positions.

The mechanism for stopping the drum in position for feeding a new copy sheet thereto will be described first. This mechanism comprises a control lever 110 mounted to pivot about a stub shaft 111 mounted in the frame 22. The control lever 110 supports at its free end one end of an operating bar 113. This operating bar is supported at its other end by a lever (not shown) resembling the lever 110 and having a pivotal axis coincident with the pivotal axis of the lever 110. A stop pin 112a projecting from the frame 22 limits movement of the lever 110 in a counter-clockwise direction (Fig. 10). Pivoted upon the stub shaft 111 is a trip lever 116 comprising an arm 116a to which the lever 110 is secured. A pin 129 projects from the arm 116a for a purpose hereinafter described. It will be noted that if the lever 110 is displaced angularly in a clockwise direction (Fig. 10), the lever 116 will be displaced in the same direction through the same angle.

The lever 116 also comprises an arm 116c which at its free end is provided with a rubber cushion 116d. The rubber cushion 116d is disposed between the free end of the arm 116c and a stop plate 117 which is carried by the arm 116c, and is free to move slightly toward and away from the free end of the arm 116c. The stop plate 117 is engageable with the shoulders 105 and 96a to stop the drum 54 in a position wherein a new copy sheet may be fed to it. A pin 119 projecting from the arm 116c is connected to a pin 121 by a spring 120. The pin 121 projects from the frame 22. Obviously, the spring 120 yieldingly urges the arm 116c in a counterclockwise direction (Fig. 10).

Pivoted upon the pin 111 is a latching lever 122 provided with a transversely extending latching lug 122a at its free end. The lug 122a is engageable with a shoulder 108e provided upon the block 108 (Figs. 14 and 15).

Latching member 122 has a shoulder 122b which is engageable with a pin 116k projecting from the lever 116. A spring 116m has one of its ends secured to the pin 116k and has the other of its ends secured to a pin 122c projecting from the latching member 122. The spring 116m yieldingly urges the pin 116k against the shoulder 122b. When the lever 116 is displaced in a clockwise direction (Fig. 10) through similar displacement of the lever 110 by the operator, the pin 116k pushes against the shoulder 122b and displaces the latching lever 122 through the same angular distance. If the lug 122a has been in engagement with the shoulder 108e, such displacement of the latching lever 122 will disengage the lug from the shoulder.

Figure 12:
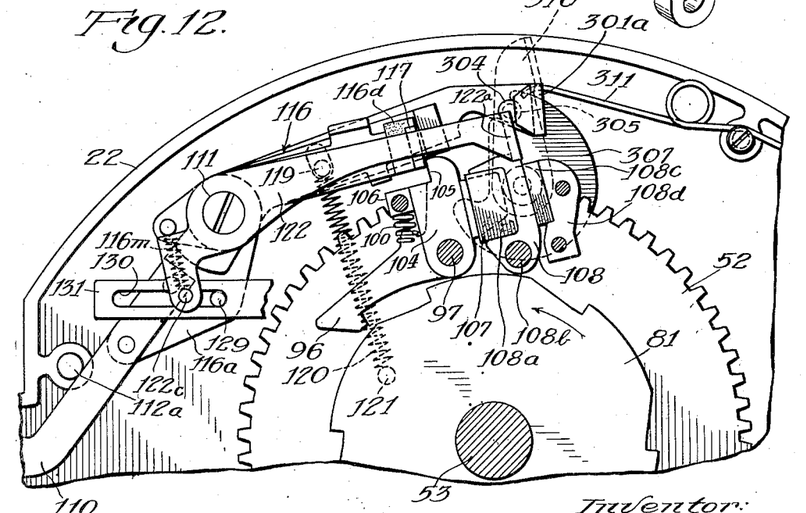
Fig. 12 is a fragmentary section taken on substantially the same line as Fig. 11 but showing certain parts in changed positions.

The operation of the above described mechanism for stopping and holding the duplicating drum in a position wherein a new copy sheet may be fed thereto will now be described. If it is assumed that the mechanism shown in Figs. 10 and 12 is in the condition in which it is illustrated in these figures, and if it is assumed that the motor 27 is driving the gear 52 continuously, it will be readily understood that as long as the plate 117, carried by the trip lever 116, engages the shoulders 96a and 105, of the tail piece 96b and the block 104, respectively, the drum 54 is held against rotation in a clockwise direction (Fig. 10). The drum 54 is held against rotation in a counter-clockwise direction (Fig. 10) by the latching lug 122a which is in engagement with the shoulder 108e. It is understood, of course, that the latching member 122 and the trip lever 116 are carried by the frame 22 and do not rotate with the drum but that the mechanism mounted upon the plate 99 must rotate when the drum rotates. Now if the operator has fed a new copy sheet to the combined moistening and feeding rollers 235 and 241 and wishes to have the machine operate through another cycle of operations, the operator presses against the bar 113 to displace the lever 110 in a clockwise direction (Fig. 10) against the action of the spring 120, whereupon the trip lever 116 is displaced angularly in the same direction and disengages the plate 117 from the shoulders 96a and 105. The pin 116k simultaneously acts against the shoulder 122b and lifts the free end of the latching lever 122 to disengage the lug 122a from the shoulder 108e. When the plate 117 is disengaged from the shoulder 96a, the spring 100 causes the pawl 96 to be displaced angularly in a clockwise direction (Fig. 15) so that it engages the ratchet 81, whereupon the pawl 96 and the remaining mechanism carried by the plate 99, as well as the plate 99 itself, rotate with the ratchet wheel 81. As the drum 54 is constrained to rotate with the plate 99, it also rotates in unison with the ratchet 81. The bar 113 is released by the operator during the initial movement of the drum 54, whereupon the spring 120 restores the lever 110, the trip lever 116 and the latching lever 122 to the positions wherein they are shown in Figs. 10 and 12. Therefore, when the drum completes one revolution carrying the plate 99 with it, the plate 117 carried by the trip lever 116 is in the proper position to engage the shoulders 96a and 105 so as to withdraw the pawl 96 from engagement with the ratchet 81 and stop the drum. The latch member 122 is raised out of the path of the shoulders 105 and 96a during the final movement of the drum by the plate 99 but the plate 99 is notched as at 99a to permit the latching lug 122a to drop and engage the shoulder 108e so that the drum is locked against rotation in either direction. Of course, during the rotation of the drum through a complete revolution, a copy sheet has been moistened and applied to the master sheet 26 and discharged into the tray 208. When the operator has fed the next copy sheet, the operator simply depresses the bar 113 and the above described cycle of operations is again repeated.

Figure 3:
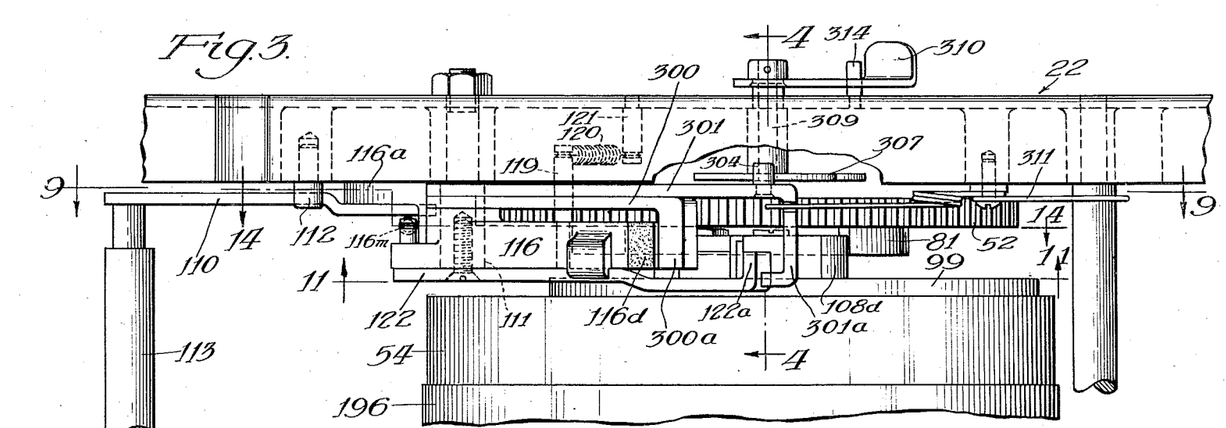
Fig. 3 is a fragmentary plan view of the apparatus shown in Fig. 2.
Figures 4, 6, 7, 8:
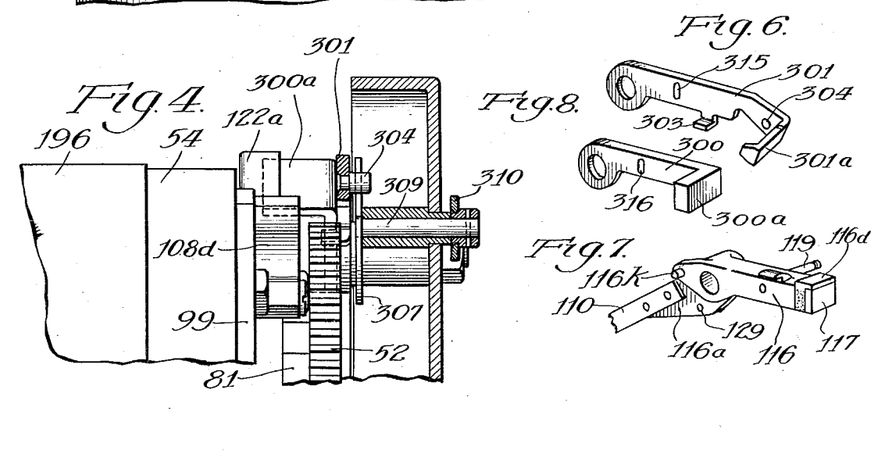
Fig. 4 is a fragmentary section taken on line 4—4 of Fig. 3.
Fig. 6 is a perspective view of an auxiliary latching member forming part of the improved duplicating machine.
Fig. 7 is a perspective view of a trip lever which forms part of the improved duplicating machine.
Fig. 8 is a perspective view of an auxiliary trip lever which forms part of the improved duplicating machine.
Figure 5:
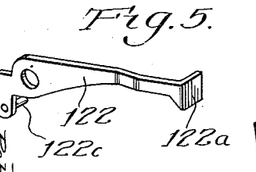
Fig. 5 is a perspective view of a latching member forming part of the improved duplicating machine.

Referring now to Figs. 3, 10, 11, 12 and 14, it will be noted that an auxiliary trip lever 300 and an auxiliary latching member 301 are also pivoted upon the pin 111 between the frame and the trip lever 116 for stopping the drum at a slightly different point so as to have a different sized margin at the top of the copy sheet. The auxiliary trip lever 300 has a laterally projecting lug 300a which may assume the position wherein it is shown in Fig. 14 so that it is disposed in front of the plate 117 and is engageable with the shoulders 96a and 105. The latch member 301 is provided with a latching lug 301a which is engageable with the lug 108e as best shown in Fig. 14. The latch lever 301 is provided with a lug 303 intermediate its ends, which lug 303 lies beneath the trip lever 300 so that when the latch member 301 is displaced in a clockwise direction (Fig. 10) the lug 303 lifts the trip lever 300. Projecting from the free end of the latch member 301 is a pin 304 adapted to engage one or the other of two notches 305 and 306 provided in a plate 307 fixed to a pin 309 which is pivoted in the frame 22 (Fig. 3). At its outer end, the pin 309 is provided with a lever 310 whereby it may be displaced angularly to bring the plate 307 into a position wherein the pin 304 engages the notch 305 or into a position wherein the pin 304 engages the notch 306. In Fig. 10, the pin 304 is resting in the notch 305 and the construction is such that the latch lever 301 is held in a position wherein it is out of the path of the shoulder 108e, of the trip lever 300 being held out of the path of the shoulders 96a and 105 by the lug 303. This is the condition to which the machine is adjusted when it is operated in the manner described above so that the trip lever 116 and the latch member 122 co-operate to lock the drum 54 against rotation at the end of each cycle of operations.

It will be noted that a spring 311 yieldingly urges the latching member 301 in a counter-clockwise direction (Fig. 10). It will also be noted that angular displacement of the lever 310 is limited, in one direction, by a stop pin 314, as is shown in Fig. 3.

Figure 9:
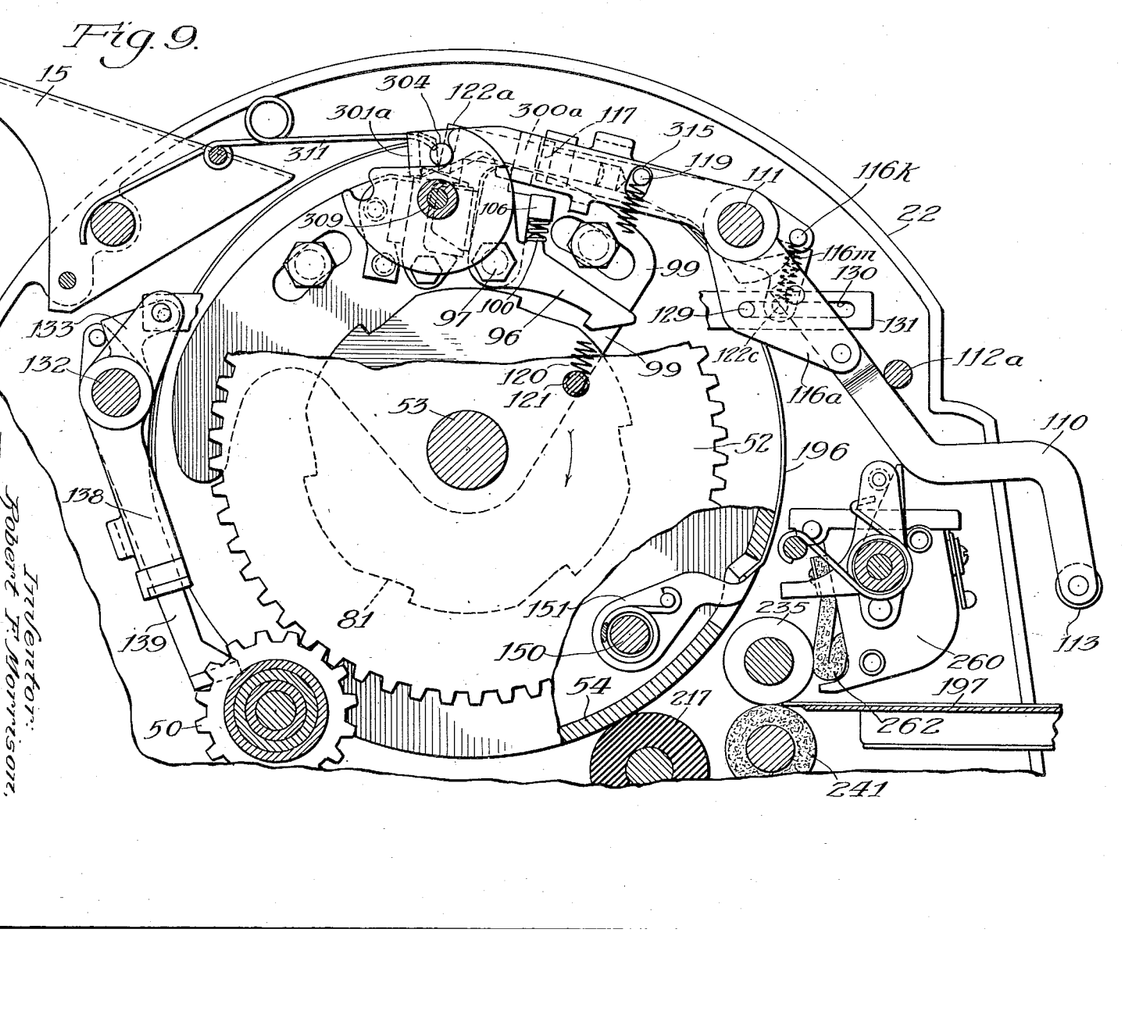
Fig. 9 is a fragmentary section taken on line 9—9 of Fig. 3.

When the plate 307 is displaced into the position wherein the pin 304 engages the notch 306, as best illustrated in Fig. 9, by a movement of the lever 310, the lug 300a assumes the function of the plate 117 and the latching lug 301a assumes the function of the latching lug 122a so that these lugs 300a and 301a stop the drum at the end of each revolution and lock it against rotation in either direction. In Fig. 14 the manner in which the lug 300a engages the shoulders 96a and 105 and the manner in which the lug 301a engages the shoulder 108e are illustrated. It will be understood that while the trip lever 116 and the latch member 122 go through the same motions when their functions are assumed by the trip lever 30 and the latching member 301, respectively, as they do when the trip lever 116 and the latching member 301 are held in their functionally operative positions as illustrated in Fig. 10, they do not perform any special duties. It will be noted that the latch member 301 has an arcuate slot 315 through which the pin 119 projects. The trip lever 300 is provided with a similar slot 316 through which the pin 119 also projects. When the apparatus is adjusted as shown in Figs. 9 and 14, the pin 119 is in the upper ends of the slots 315 and 316 so that when the operator presses the bar 113 the trip lever 116 will be displaced in the same manner as it was displaced when the apparatus is adjusted as shown in Fig. 10. And this movement of the trip lever 116 will cause the pin 119 to displace the trip lever 300 and the latch member 301 in a clockwise direction (Fig. 14) so that the pawl 96 will engage the ratchet 81 and the duplicating drum will make one complete revolution to be stopped by the lug 300a at the end of the revolution. Simultaneously, the lug 301a rides upon the plate 99 during the final movement of the drum and then drops into engagement with the shoulder 108e.

The first control mechanism described above is connected to the second control mechanism which is utilized to stop the drum 54 in the position wherein a new master sheet may be secured thereto by a link 131 having a slot 130 in which the pin 129 projecting from the trip lever 116 rides. This second control mechanism is mounted upon a shaft 132 and is connected by a bifurcated arm 133 to the link 131. The shaft 132 is journalled in the frame 22 and extends across the machine. Means (not shown) is provided for rocking the shaft 132. Pivoted on the shaft 132 is a lever 138 which corresponds to the lever 116 described above and has the same function in that it is engageable with the shoulders 96a and 105 to hold the drum against rotation in one direction. Also pivoted on the shaft 132 is a latching member 139 which is engageable with the shoulder 108e to prevent rotation of the drum 54 in the opposite direction. The shaft 132 may be rocked manually to bring the first described control mechanism into a functionally inoperative position, the second control mechanism comprising the trip lever 138 being then rendered functionally operative. After a new master sheet has been inserted, the first control mechanism is rendered again functionally operative and the second control mechanism is rendered functionally inoperative. The details of the second control mechanism do not form a part of this invention and therefore no further description will be given of them.

Figures 11, 13:
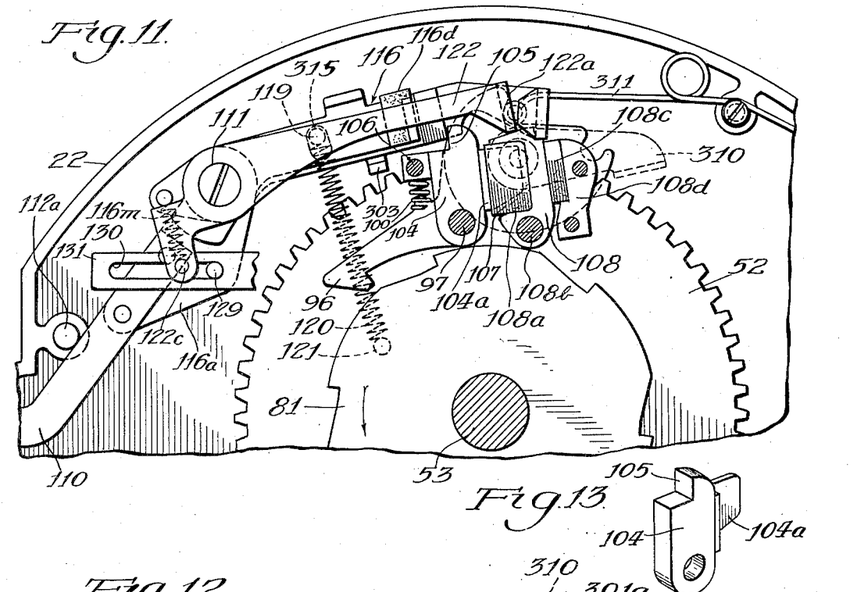
Fig. 11 is a fragmentary section taken on line 11—11 of Fig. 3.
Fig. 13 is a perspective view of a block and a bracket member, which block and bracket member form parts of the improved duplicating machine.

It will be readily understood that when the first control mechanism is functionally operative in such manner that the trip lever 116 and the latch lever 122 function to lock the drum 54 against rotation in either direction at the end of each cycle of operations, as shown in Figs. 10 and 12, a certain predetermined margin will be left at the top end of each copy sheet. Now if it is desired to have a larger margin at the top of each copy sheet, the apparatus is adjusted as shown in Figs. 9, 11 and 14 so that the drum is controlled by the trip lever 300 and the latch member 301. This is readily understood when it is noted that the feeding rollers are driven in synchronism with the drum 54 and stop when the drum stops. When the trip lever 116 is functioning, it stops the drum a certain angular distance from the platen roller 217. Then when the drum starts to rotate, the feed rollers also rotate and a certain margin is left at the upper or forward end of each copy sheet. When the trip lever 300 is functioning, it stops the drum at a greater angular distance from the platen roller 217 and while the copy sheet will reach the platen roller 217 in the same period of time that was required when the trip lever 116 was in operation, the master sheet will reach the platen roller 217 a little later than it does when the lever 116 is in operation. Therefore, the margin will be larger.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:—

1. In a duplicating machine, a frame, a duplicating drum rotatably mounted therein, a power driven member rotatably mounted on said frame, means for connecting said drum to said power driven member, means for locking said drum in a predetermined position at the end of each cycle of operations, a second means for locking said drum in another predetermined position at the end of each cycle of operations, means for causing either one of said locking means to become functionally inoperative and the other to become functionally operative, and common means for causing either said first-mentioned locking means or said second locking means to release said drum.

2. In a duplicating machine, a frame, a duplicating drum rotatably mounted therein, a power driven member rotatably mounted on said frame, means for connecting said drum to said power driven member, means for locking said drum in a predetermined position at the end of each cycle of operations, a second means for locking said drum in another predetermined position at the end of each cycle of operations, means for causing either one of said locking means to become functionally inoperative and the other to become functionally operative, and manually operable means common to both said first-mentioned locking means and said second locking means for causing either said first-mentioned locking means or said second locking means to release said drum.

3. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, means for locking said drum in a predetermined position with respect to said platen roller at the end of each cycle of operations, a second means for locking said drum in another predetermined position at the end of each cycle of operations, means for causing either one of said locking means to become functionally inoperative and the other to become functionally operative, and common means for causing either said first-mentioned locking means or said second locking means to release said drum.

4. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, means for locking said drum in a predetermined position with respect to said platen roller at the end of each cycle of operations, a second means for locking said drum in another predetermined position at the end of each cycle of operations, means for causing either one of said locking means to become functionally inoperative and the other to become functionally operative, and manually operable means common to said first-mentioned locking means and said second locking means for causing either said first-mentioned locking means or said second locking means to release said drum.

5. In a duplicating machine, a frame, a duplicating drum rotatably mounted therein, a power driven member rotatable on said frame, means for connecting said drum to said power driven member, means for stopping said drum in a predetermined position at the end of each cycle of operations, a second means for stopping said drum in another predetermined position at the end of each cycle of operations, means for causing either one of said stopping means to become functionally inoperative and the other to become functionally operative, and common means for causing either the first-mentioned stopping means or said second stopping means to release said drum.

6. In a duplicating machine, a frame, a duplicating drum rotatably mounted therein, a power driven member rotatable on said frame, means for connecting said drum to said power driven member, means for stopping said drum in a predetermined position at the end of each cycle of operations, a second means for stopping said drum in another predetermined position at the end of each cycle of operations, means for causing either one of said stopping means to become functionally inoperative and the other to become functionally operative, and manually operative means common to said first-mentioned stopping means and said second stopping means for causing either said first-mentioned stopping means or said second stopping means to release said drum.

7. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, means for stopping said drum in a predetermined position with respect to said platen roller at the end of each cycle of operations, a second means for stopping said drum in another predetermined position at the end of each cycle of operations, means for causing one of said stopping means to become functionally inoperative and the other to become functionally operative, and common means for causing either said first-mentioned stopping means or said second stopping means to release said drum.

8. In a duplicating machine, a duplicating drum rotatably mounted therein, a power driven member rotatably mounted on said drum, means for connecting said drum to said power driven member, means for stopping said drum in a predetermined position at the end of each cycle of operations, a second means for stopping said drum in another predetermined position at the end of each cycle of operations, a third means for stopping said drum in a third predetermined position, means for causing any two of said stopping means to become functionally inoperative and the other to become functionally operative, and common means for causing either said first-mentioned stopping means or said second stopping means to release said drum.

9. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, means pivotally mounted on said frame for stopping said drum in a predetermined position with respect to said platen roller at the end of each cycle of operations, a second means pivoted on said frame for stopping said drum in another predetermined position at the end of each cycle of operations, the pivotal axes of said stopping means being co-incident, means for causing either one of said stopping means to become functionally inoperative and the other to become functionally operative, and common means for causing either said first-mentioned stopping means or said second stopping means to release said drum.

10. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, means pivotally mounted on said frame for locking said drum in a predetermined position with respect to said platen roller at the end of each cycle of operations, said locking means locking said drum against rotation in either direction, a second means pivotally mounted on said frame for locking said drum in another predetermined position at the end of each cycle of operations, said second locking means locking said drum against rotation in either direction, the pivotal axes of said locking means being co-incident, means for causing either one of said locking means to become functionally inoperative and the other to become functionally operative, and common means for causing either said first-mentioned locking means or said second locking means to release said drum.

11. In a duplicating machine, a frame, a duplicating drum rotatably mounted therein, a power driven ratchet wheel rotatably mounted on said frame, a pawl engageable with said ratchet wheel and mounted to rotate with said drum whereby said drum is rotated when said pawl engages said ratchet wheel, a platen roller co-operating with said drum, means for feeding copy sheets to said drum and said platen roller, means for stopping said drum in a predetermined position with respect to said platen roller at the end of each cycle of operations, a second means for stopping said drum in another predetermined position at the end of each cycle of operations, means for causing either one of said stopping means to become functionally inoperative and the other to become functionally operative, the stopping means which is functionally operative being adapted to control said pawl, and common means for causing either said first-mentioned stopping means or said second stopping means to release said drum.

12. In a duplicating machine, a frame, a duplicating drum rotatably mounted therein, a power driven member rotatably mounted on said frame, means for connecting said drum to said power driven member, a plurality of means for stopping said drum in a plurality of predetermined positions at the end of each cycle of operations, means for causing either one of said stopping means to become functionally inoperative and the other to become functionally operative, and means common to said plurality of stopping means for causing the functionally operative stopping means to release said drum.

13. In a duplicating machine, a frame, a duplicating drum rotatably mounted therein, a power driven member rotatably mounted on said frame, means for connecting said drum to said power driven member, a plurality of means for locking said drum in a plurality of predetermined positions at the end of each cycle of operations, said locking means locking said drum against rotation in either direction, means for causing either one of said locking means to become functionally inoperative and the other to become functionally operative, and means common to said plurality of locking means for causing the functionally operative locking means to release said drum.

14. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, a plurality of means for stopping said drum in a plurality of predetermined positions at the end of each cycle of operations, means for causing either one of said stopping means to become functionally inoperative and the other to become functionally operative, and means common to said plurality of stopping means for causing the functionally operative stopping means to release said drum.

15. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller, a plurality of means for locking said drum in a plurality of predetermined positions at the end of each cycle of operations, said locking means locking said drum against rotation in either direction, means for causing either one of said locking means to become functionally inoperative and the other to become functionally operative, and means common to said plurality of locking means for causing the functionally operative locking means to release said drum.

16. In a duplicating machine, a frame, a duplicating drum rotatably mounted therein, a power driven member rotatably mounted on said frame, means for connecting said drum to said power driven member, a plurality of means for locking said drum alternatively in a plurality of predetermined positions at the end of each cycle of operations, said locking means locking said drum against rotation in either direction, and means for causing either one of said locking means to become functionally inoperative and the other to become functionally operative.

17. In a duplicating machine, a frame, a duplicating drum rotatably mounted therein, a power driven member rotatably mounted on said frame, means for connecting said drum to said power driven member, a platen roller co-operating with said drum, means for feeding copy sheets to said drum and said platen roller a plurality of manually controlled means for locking said drum alternatively in a plurality of predetermined positions with respect to said platen roller at the end of each cycle of operations, and means for causing either one of said locking means to become functionally inoperative and the other to become functionally operative.

18. In a duplicating machine, the combination of a frame, a duplicating drum rotatably mounted on said frame, a motor, means for operatively connecting said motor with said drum for driving the drum, means comprising two separate locking mechanisms for holding the drum alternatively in a plurality of different copy sheet receiving positions, means for setting the parts for causing either one of said locking means to become functionally inoperative and the other to become functionally operative, means adapted when the drum reaches its stop position corresponding to either set condition of the parts for releasing the drum from said driving means, and operating means adapted upon actuation when the drum is held locked in either of its said stop positions to cause the drum to be released from said locking means and to be again operatively connected with said driving means.

19. In a duplicating machine, the combination of a frame, a duplicating drum rotatably mounted on said frame, a motor, means for operatively connecting said motor with said drum for driving the drum, means comprising two separate locking mechanisms for holding the drum alternatively in a plurality of different copy sheet receiving positions, means for setting the parts for causing either one of said locking means to become functionally inoperative and the other to become functionally operative, and means cooperating with said locking mechanisms alternatively serving to release the drum from said driving means when the drum reaches its stop position corresponding to either set condition of the parts.

20. In a duplicating machine, the combination of a frame, a duplicating drum rotatably mounted on said frame, a driving member rotatably mounted on said drum, means for rotating said driving member, means for releasably connecting said driving member with said drum for rotating the drum, means comprising a lever pivotally mounted on said frame adapted by engagement with latch means carried by the drum to stop the drum in copy sheet receiving position, means comprising a second lever pivotally mounted on said frame and extending beyond the end of said first named lever adapted when in operative position to engage said latch means so as to stop the drum in a different copy sheet receiving position and serving in such operative position to prevent effective engagement of said first named lever with said latch means, releasable means for holding said second lever out of operative position, and means adapted when the drum is stopped by either of said levers to release said drum from said driving means.

21. In a duplicating machine, the combination of a frame, a duplicating drum rotatably mounted on said frame, a driving member rotatably mounted on said drum, means for rotating said driving member, means for releasably connecting said driving member with said drum for rotating the drum, means comprising a lever pivotally mounted on said frame adapted by engagement with latch means carried by the drum to stop the drum in copy sheet receiving position, means comprising a second lever of greater length than said first named lever and pivotally mounted on the same axis on said frame adapted when in operative position to engage said latch means so as to stop the drum in a different copy sheet receiving position and serving in such operative position to prevent effective engagement of said first named lever with said latch means, manually operable means on said frame for holding said second lever in operative position or alternatively swung outwardly out of the path of movement of said latch means, means adapted when the drum is stopped by either of said levers to release said drum from said driving means, and operating means adapted upon actuation when the drum is held locked in either of its said stop positions to cause the drum to be released from said locking means and to be again operatively connected with said driving means.

ROBERT F. MORRISON.